US010841168B2

(12) United States Patent
Byrnes et al.

(10) Patent No.: US 10,841,168 B2
(45) Date of Patent: Nov. 17, 2020

(54) DOMAIN NAME SYSTEM BASED VPN MANAGEMENT

(71) Applicant: ThreatSTOP, Inc., Carlsbad, CA (US)

(72) Inventors: Tomas L. Byrnes, San Marcos, CA (US); Francis Turner, Carlsbad, CA (US)

(73) Assignee: ThreatSTOP, Inc., Carlsbad, CA (US)

( * ) Notice: Subject to any disclaimer, the term of this patent is extended or adjusted under 35 U.S.C. 154(b) by 0 days.

(21) Appl. No.: 16/520,365

(22) Filed: Jul. 24, 2019

(65) Prior Publication Data
US 2020/0059409 A1 Feb. 20, 2020

Related U.S. Application Data

(63) Continuation of application No. 15/087,493, filed on Mar. 31, 2016, now Pat. No. 10,361,920.

(60) Provisional application No. 62/141,778, filed on Apr. 1, 2015.

(51) Int. Cl.
H04L 12/24 (2006.01)
H04L 29/12 (2006.01)
H04L 29/06 (2006.01)

(52) U.S. Cl.
CPC .......... H04L 41/12 (2013.01); H04L 61/1511 (2013.01); H04L 61/2592 (2013.01); H04L 63/0272 (2013.01); H04L 63/0428 (2013.01); H04L 63/08 (2013.01)

(58) Field of Classification Search
None
See application file for complete search history.

(56) References Cited

U.S. PATENT DOCUMENTS

| 8,533,822 | B2 | 9/2013 | Byrnes | |
|---|---|---|---|---|
| 2003/0028650 | A1 | 2/2003 | Chen | |
| 2003/0200321 | A1* | 10/2003 | Chen | H04L 63/0272 709/229 |
| 2004/0168049 | A1* | 8/2004 | Lee | H04L 63/0428 713/150 |
| 2005/0193103 | A1* | 9/2005 | Drabik | H04L 63/0272 709/221 |
| 2007/0234061 | A1 | 10/2007 | Teo | |
| 2007/0271606 | A1* | 11/2007 | Amann | H04W 12/02 726/15 |
| 2007/0286214 | A1* | 12/2007 | Goel | H04W 8/18 370/401 |
| 2009/0031028 | A1 | 1/2009 | Kumar | |

(Continued)

OTHER PUBLICATIONS

International Application No. PCT/US2016/025389, International Search Report and Written Opinion dated Jun. 24, 2016.

Primary Examiner — Nicholas R Taylor
Assistant Examiner — Tania M Pena-Santana
(74) Attorney, Agent, or Firm — Ahmann Kloke LLP

(57) ABSTRACT

VPN data for building and maintaining VPNs through a public network is gathered. The VPN data is maintained, at a DNS server, as part of a DNS table. A portion of the VPN data is provided as part of a DNS view of the DNS table to a client device. A VPN mode indicating a manner to establish a VPN node for the client device through the public network is determined using the portion of the VPN data. When the client device is coupled to the public network the VPN node is established and maintained according to the VPN mode using the portion of the VPN data.

20 Claims, 5 Drawing Sheets

(56) References Cited

U.S. PATENT DOCUMENTS

| | | | |
|---|---|---|---|
| 2010/0077204 A1* | 3/2010 | Kawano | H04L 63/0428 |
| | | | 713/153 |
| 2011/0238801 A1* | 9/2011 | Bahl | H04L 29/12066 |
| | | | 709/221 |
| 2012/0173680 A1* | 7/2012 | Coskun | H04L 63/0272 |
| | | | 709/220 |
| 2014/0047500 A1 | 2/2014 | Byrnes | |

* cited by examiner

DOMAIN NAME SYSTEM BASED VPN MANAGEMENT

CROSS-REFERENCE TO RELATED APPLICATIONS

This application is a continuation of U.S. patent application Ser. No. 15/087,493, filed Jul. 23, 2019, which claims priority to U.S. Provisional Application Ser. No. 62/141,778, filed Apr. 1, 2015, both of which are incorporated herein by reference.

BACKGROUND

An area of ongoing research and development is managing virtual private network (hereinafter referred to as "VPN") devices. In particular there exists a need for managing VPNs while limiting consumption of bandwidth and network resources.

The foregoing examples of the related art and limitations related therewith are intended to be illustrative and not exclusive. Other limitations of the relevant art will become apparent to those of skill in the art upon reading the specification and studying of the drawings.

SUMMARY

The following implementations and aspects thereof are described and illustrated in conjunction with systems, tools, and methods that are meant to be exemplary and illustrative, not necessarily limiting in scope. In various implementations one or more of the above-described problems have been addressed, while other implementations are directed to other improvements.

In various implementations, VPN data for building and maintaining VPNs through a public network is gathered. Further, in various implementations, the VPN data is maintained, at a DNS server, as part of a DNS table. In various implementations, a portion of the VPN data is provided as part of a DNS view of the DNS table to a client device. Additionally, in various implementations, a VPN mode indicating a manner to establish a VPN node for the client device through the public network is determined using the portion of the VPN data. In various implementations, when the client device is coupled to the public network the VPN node is established and maintained according to the VPN mode using the portion of the VPN data.

These and other advantages will become apparent to those skilled in the relevant art upon a reading of the following descriptions and a study of the several examples of the drawings.

DETAILED DESCRIPTION

Figure 1:
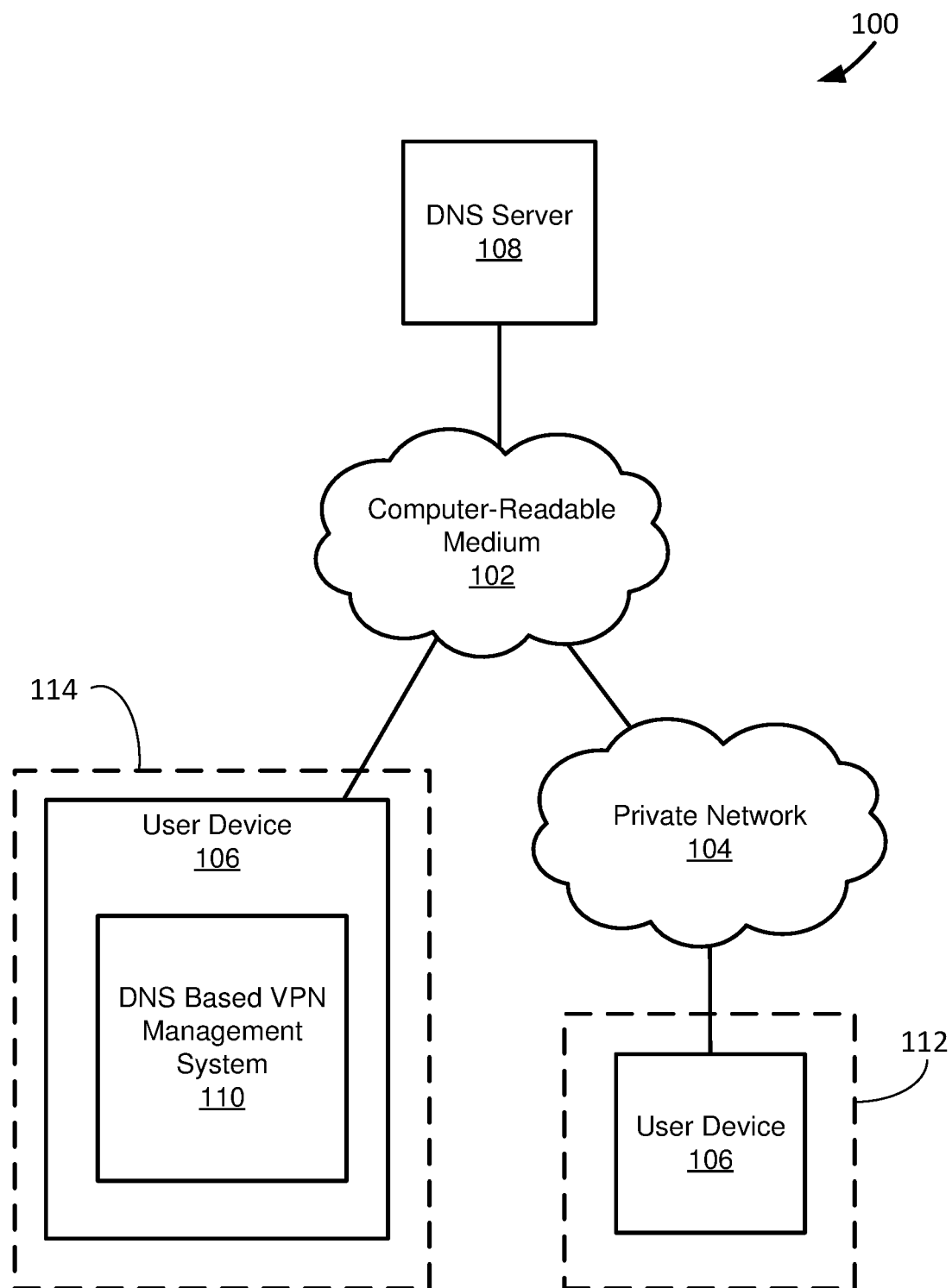
FIG. 1 depicts a diagram of an example of a system for managing VPN connections to a private network using a DNS server.

FIG. 1 depicts a diagram 100 of an example of a system for managing VPN connections to a private network using a DNS server. The system of the example of FIG. 1 includes a computer-readable medium 102, a private network 104, a user device 106, a DNS server 108, and a DNS based VPN management system 110. In the example system shown in FIG. 1, the user device 106 is coupled to the computer-readable medium 102 through the private network 104 when the user device 106 is at a local network location 112 and is coupled to the computer-readable medium 102 when the user device 106 is at a remote network location 114.

The computer-readable medium 102 and other computer readable mediums discussed in this paper are intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The computer-readable medium 102 and other computer readable mediums discussed in this paper are intended to represent a variety of potentially applicable technologies. For example, the computer-readable medium 102 can be used to form a network or part of a network. Where two components are co-located on a device, the computer-readable medium 102 can include a bus or other data conduit or plane. Where a first component is co-located on one device and a second component is located on a different device, the computer-readable medium 102 can include a wireless or wired back-end network or LAN. The computer-readable medium 102 can also encompass a relevant portion of a WAN or other network, if applicable.

The computer-readable medium 102, the private network, the user device 106, the DNS server 108, the DNS based VPN management system 110, and any other applicable systems or devices described in this paper can be implemented as a computer system or parts of a computer system or a plurality of computer systems. A computer system, as used in this paper, is intended to be construed broadly. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. Depending upon implementation-specific or other considerations, the I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, ISDN modem, cable modem, token ring interface, satellite transmission interface (e.g. "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to end user devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their end user device.

A computer system can be implemented as an engine, as part of an engine or through multiple engines. As used in this paper, an engine includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor. The processor transforms data into new data using implemented data structures and methods, such as is described with reference to the FIGS. in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

The private network 104 functions to transmit data between devices privately. Depending upon implementation-specific or other considerations, the private network 104 can be implemented through either or both tunneling of data packets from sources to recipients and dedicated equipment. For example, the private network 104 can include dedicated servers for transmitting data between devices in the private network 104. In another example, the private network 104 can be established, at least in part, by encrypting data transmitted between devices in the private network 104.

The user device 106 functions to send and receive data. When the user device 106 is at a local network location 112, the user device can send and receive data through the private network 104. When the user device 106 is at a remote network location 114, the user device 106 can send and receive data using a VPN created through a public network as part of the computer-readable medium 102. Depending upon implementation-specific or other considerations, the user device 106 can be a thin client device or an ultra-thin client device. Further depending upon implementation-specific or other considerations, the user device 106 can include a wireless network interface, through which the user device 106 can wirelessly send and receive data.

The DNS server 108 functions to provide VPN data for establishing VPN nodes for devices at remote network locations using DNS tables. In various implementations, the DNS server 108 can provide VPN data according to the methods of DNS resolution described in U.S. Pat. No. 8,533,822 (hereinafter referred to as the "'822 patent"), which is incorporated by reference. VPN data can include policies of a private network for establishing a VPN node, equipment to communicate with in establishing a VPN node, a passphrase or secret, otherwise referred to as a cipher, used in verifying a user for establishing a VPN node, network locations and/or identifications of equipment to communicate with in establishing a VPN node, sources that can send and receive data through a VPN node, and parameters related to data traffic communicated using a VPN node. For example VPN data can specify that in order to establish a VPN from a specific network location, data needs to be sent to and receive from specific dedicated equipment. In another example, VPN data can specify that in order to establish a VPN from a specific network location, that data sent from and received at the network location needs to be encrypted. Depending upon implementation-specific or other considerations VPN data can be specific to a network location of a device attempting to establish a VPN node. For example VPN data can specify to establish a connection with first equipment if a device is at a first network location in a public network and to establish a connection with second equipment if a device is at a second network location in a public network.

In a specific implementation, the DNS server 108 functions to gather data for generating VPN data included as part of one or a plurality of DNS tables. In various implementations, the DNS server can gather and organize VPN data according to the methods of gathering network information described in the '822 patent. In acquiring data for generating VPN data, the DNS server 108 can acquire data relating to at least one specific location in the private network 104 from one or more sources. Depending upon implementation-specific or other considerations, a source from which data is gathered by the DNS server 108 can be from a user device or a networking device or equipment used in transmitting data through the private network 104. The information acquired can be, for example, an internet protocol address, an internet protocol subnet or any unique information necessary for developing a network policy for the private network 104. Additionally further information can be acquired regarding the character of at least one specific location in the private network 104. In a specific implementation, the specific location in the private network 104 can be a node and a character of the node in the private network 104 can be based on at least one parameter relating to traffic to or from the at least one specific location in the private network 104.

In a specific implementation, the DNS server 108 can manually collect data used in generating VPN data and/or automatically collect data used in generating VPN data. For example, the DNS server 108 can visit or crawl lists for data, for example IP addresses and or IP subnets of spammers. In another example, clients, subscribers or volunteers can send in IP addresses and subnets based on a character of a node in a private network 104 relating to the addresses and subnets to the DNS server 108.

In a specific implementation, in generating VPN data that can be provided through a DNS table, the DNS server can associate VPN data with a domain name. Depending upon implementation-specific or other considerations, VPN data can be associated with a domain name based on a network location that is the subject of the VPN data. Further depending upon implementation-specific or other considerations, VPN data can be associated with a domain name based on a network node of the private network 104 that is the subject of the VPN data.

In a specific implementation, the DNS server 108 functions to provide results including VPN data in response to DNS queries. In various implementations, the DNS server 108 can provide results to DNS queries according to the methods detailed in the '822 patent. The DNS server 108 can provide results based on a device that sends a query and/or a network location of a device that sends a query. For example, the DNS server 108 can provide a different view based on whether a device is in a private network location or at a network location remote from the private network.

In a specific implementation, the DNS server 108 function to provide results to DNS queries if a device provides a password or passphrase. In various implementations, the DNS server 108 can check whether a received password or passphrase matches a password or passphrase assigned to a user to determine whether to provide results to DNS queries used in establishing a VPN node. In utilizing a password or passphrase to check whether to provide DNS results, the DNS server 108 can prevent hackers from accessing a private network through a VPN node.

The DNS based VPN management system 110 functions to manage establishment of a VPN node using a DNS server. Depending upon implementation-specific or other considerations, the DNS based VPN management system 110 can be, at least in part, a batch file executed at a device for establishing a VPN node at the device. In managing establishment of a VPN node, the DNS based VPN management system 110 can send queries to a DNS server to receive VPN data used in establishing a VPN node. Depending upon implementation-specific or other considerations, the DNS based VPN management system 110 can formulate queries based on data previously received from a DNS server. For example, the DNS based VPN management system 110 can formulate a query based on a list received from a DNS server of potential networking devices to communicate with in establishing a VPN node. Depending upon implementation-specific or other considerations, the DNS based VPN management system 110 can be implemented as part of a travel router utilized by the user device 106 to establish a network connection.

In a specific implementation, the DNS based VPN management system 110 functions to provide a password or a passphrase to a DNS server in order to receive results to queries from the DNS server. The DNS based VPN management system 110 can provide a password or a passphrase uniquely associated with a user and input by the user. For example, the DNS based VPN management system 110 can provide a passphrase input by a user when the user attempts to establish a VPN node at a device.

In a specific implementation, the DNS based VPN management system 110 functions to determine how to establish a VPN node based on VPN data determined from a DNS server. Specifically, the DNS based VPN management system 110 can determine a "VPN mode" for a device from VPN data. As used in this paper, a "VPN mode" is a manner by which a VPN is established. For example a VPN mode can include VPN tunneling or using dedicated equipment.

In a specific implementation, the DNS based VPN management system 110 functions to establish a VPN node according to a determined VPN mode. The DNS based VPN management system 110 can send data to a networking device, as determined from VPN data, to establish a VPN node at a device. Depending upon implementation-specific or other considerations, the DNS based VPN management system 110 can encrypt data used in establishing a VPN node at a device before sending the data.

In a specific implementation, the DNS based VPN management system 110 functions to maintain a VPN node through tunneling of data sent from a device. In a specific example of operation, the DNS based VPN management system 110 encrypts a message, such as, by way of example but not limitation, a request from a user device; encapsulates the message in a VPN packet; and sends the encrypted and encapsulated message to an appropriate recipient, as determined from VPN data. Continuing the specific example of operation, the DNS based VPN management system 110 receives an encrypted and encapsulated response, decapsulates and decrypts the response. Depending upon implementation-specific or other considerations, a VPN packet, in which data is encapsulated, can include, for example, the IP address and/or MAC address of a user device and the IP address and/or MAC address of an appropriate recipient.

In a specific implementation, the DNS based VPN management system 110 functions within multiple layers of the open systems interconnection (hereinafter referred to as "OSI") model. Specifically, in receiving and transferring data the DNS based VPN management system 110 can operate within the network layer of the OSI model.

In an example of operation of the example system shown in FIG. 1, the DNS based VPN management system 110 functions to determine VPN data from responses to DNS queries received from the DNS server. In the example of operation of the example system shown in FIG. 1, the DNS based VPN management system 110 creates a VPN node to the private network 104 when the user device 106 is at a remote network location 114 based on the determined VPN data.

Figure 2:
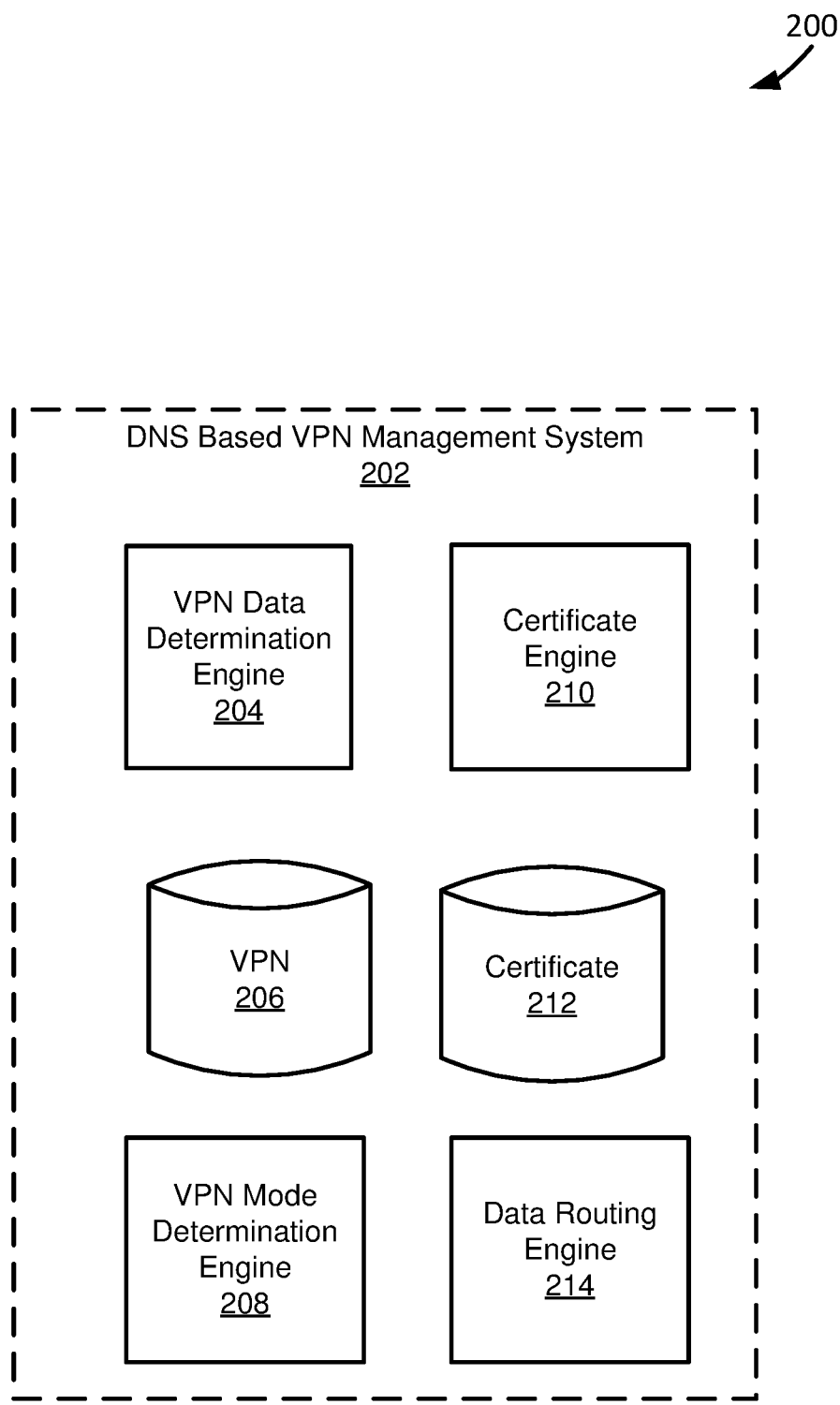
FIG. 2 depicts a diagram of an example of a DNS based VPN management system.

FIG. 2 depicts a diagram 200 of an example of a DNS based VPN management system 202. The example DNS based VPN management system 202 shown in FIG. 2 functions according to an applicable system for establishing and maintaining a VPN node using VPN data determined from a DNS server, such as the DNS based VPN management systems described in this paper.

The DNS based VPN management system 202 includes a VPN data determination engine 204, a VPN datastore 206, a VPN mode determination engine 208, a certificate engine 210, a certificate datastore 212, and a data routing engine 214. In various implementations, the VPN data determination engine 204 can be implemented, at least in part, at a DNS server. In a specific implementation, the VPN data determination engine 204 functions to determine VPN data through a view of a DNS table provided by a DNS server. In determining VPN data, the VPN data determination engine 204 can query a DNS server and receive responses to queries to determine VPN data. The VPN data determination engine 204 can query and resolve data from a DNS server according to the methods described in the '822 patent. Depending upon implementation-specific or other considerations, the VPN determination engine 204 can determine VPN data based on previous results received from a DNS server. VPN data provided by a DNS server about a specific device can be determined based on when the specific device was coupled to a private network at a local network location.

In a specific implementation, the VPN data determination engine 204 can utilize a password or passphrase provided by a user of a device to access a DNS view from a DNS server. Depending upon implementation, a DNS view can be specific to a user. For example a DNS view of a user who is an administrator of a private network can include more information than a DNS view of a user who is granted restricted access to the private network. A passphrase or password provided by the VPN data determination engine 204 can be used to determine what DNS view to allow the VPN data determination engine 204 to access or whether to allow the VPN data determination engine 204 to access a DNS table at a DNS server.

The VPN datastore 206 functions to store VPN data. VPN data stored in the VPN datastore 206 can include policies of a private network for establishing a VPN node, equipment to communicate with in establishing a VPN node, a passphrase or secret used in verifying a user for establishing a VPN node, network locations and/or identifications of equipment to communicate with in establishing a VPN node, sources that can send and receive data through a VPN node, and parameters related to data traffic communicated using a VPN node. VPN data stored in the VPN datastore 206 can be used to establish and maintain a VPN node of a private network for a device at a remote network location from the private network.

The VPN mode determination engine 208 functions to determine a VPN mode for establishing a VPN node at a device. The VPN mode determination engine 416 can determine a VPN mode for establishing a VPN node based on VPN data. Depending upon implementation-specific or other considerations, the VPN mode determination engine 208 can determine a VPN mode from a policy of a private network, as indicated by VPN data. For example, if a policy of a private network indicates to tunnel data to dedicated equipment of the private network, then the VPN mode determination engine 208 can determine that a VPN mode for establishing a VPN for the private network is to tunnel data to the dedicated equipment. In determining a VPN mode, the VPN mode determination engine 208 can determine a source to establish a connection in creating a VPN node. For example, the VPN mode determination engine 208 can determine to establish a connection with a specific server of a private network in creating a VPN node for the private network.

In a specific implementation, VPN mode determination engine 208 functions to determine a VPN mode based on user characteristics of a user of a device at which a VPN node is being established. User characteristics of a user can include an identification of a user, a title of a user, access rights of a user, and applicable data defining a user. For example, user characteristics can specify a user of a client station is an administrator and has full access privileges to data. For example, if user characteristics indicate that a user of a device has administrative access, then the VPN mode determination engine 208 can determine a VPN mode that allows the user access to all resources provided by a private network.

In a specific implementation, the VPN mode determination engine 208 functions to determine a VPN based on a network location of a device at which a VPN node is being established. For example, if a device is located within a specific country, corresponding to a network location of the device, then the VPN mode determination engine 208 can determine a VPN node can be established by communicating with dedicated equipment located in the specific country.

The certificate engine 210 functions to automatically obtain one or a plurality of certificates used in establishing and maintaining a VPN node at a device. A certificate can authorize a device to communicate in establishing and maintaining a VPN node. Depending upon implementation-specific or other considerations, a certificate can be used to establish VPN tunnels used in the routing of data as part of the VPN node. In one example, the certificate engine 210 can obtain a certificate the first time a device is attempting to establish a VPN node for a private network.

In a specific implementation, the certificate engine 210 can obtain one or a plurality of certificates based on a determined VPN mode for establishing a VPN at a device. For example, if a VPN mode indicates to tunnel data to a specific dedicated networking device, then the certificate engine 210 can obtain a certificate for communicating with the specific dedicated network device. Depending upon implementation-specific or other considerations, the certificate engine 210 can obtain one or a plurality of certificates certificate automatically without any input from a user. In another example, the certificate engine 210 can obtain a certificate based on a pre-determined amount of time after a VPN node is established. Specifically, the certificate engine 210 can obtain a certificate every month after a VPN node is established at a device. Further depending upon implementation-specific or other considerations, before obtaining a certificate, the certificate engine 210 can check to see whether a certificate for a device already resides at the device.

The certificate datastore 212 functions to store one or a plurality of certificates for establishing a VPN node at a device. In managing a VPN node, a certificate can be retrieved from the certificate datastore 212 and used to establish and/or maintain a VPN node at a device.

The data routing engine 214 functions to route data used in managing a VPN node at a device. The data routing engine 214 can route data used in establishing a VPN node at a device and maintaining the VPN node at the device. The data routing engine 214 can route data according to a determined VPN mode. For example, if a VPN mode indicates that data should be tunneled in maintaining a VPN node at a device, then the data routing engine 214 can encrypt and encapsulate data to create VPN tunnels. In another example, if a VPN mode indicates that data should be sent to a specific dedicated networking device in maintaining a VPN node, then the data routing engine 214 can send data to the specific dedicated networking device.

In a specific implementation, the data routing engine 214 functions to use one or a plurality of certificates in establishing and maintaining a VPN node at a device. In using certificates to establish and maintain a VPN node, the data routing engine 214 can include a copy of the certificates or an identification of the certificates in data transmitted for establishing and maintaining a VPN node at a device. For example, the data routing engine 214 can include a certificate in a message sent to a server for establishing a VPN node at a device.

In a specific implementation, the data routing engine 214 functions to set up and maintain VPN tunnels for sending data used in establishing and maintaining a VPN node at a device. The data routing engine 214 can be configured to encrypt and encapsulate data packets generated at a device using IP addresses or MAC addresses of the device and/or a recipient. The data routing engine 214 can also be configured to decrypt and decapsulate data received at a device using IP addresses or MAC addresses of the device and/or a sender of the data.

In an example of operation of the example system shown in FIG. 2, the VPN data determination engine 204 determines VPN data from a view of VPN data accessed through a DNS server. In the example of operation of the example system shown in FIG. 2, the VPN mode determination engine determines a VPN mode for managing a VPN node at a client device using the VPN data stored in the VPN datastore 206. Further, in the example of operation of the example system shown in FIG. 2, the certificate engine 210 retrieves a certificate used in managing the VPN node at the device. In the example of operation of the example system shown in FIG. 2, the data routing engine routes data used in establishing and maintaining the VPN node at the device using the certificate stored in the certificate datastore 212 according to the VPN mode determined by the VPN mode determination engine 208.

Figure 3:
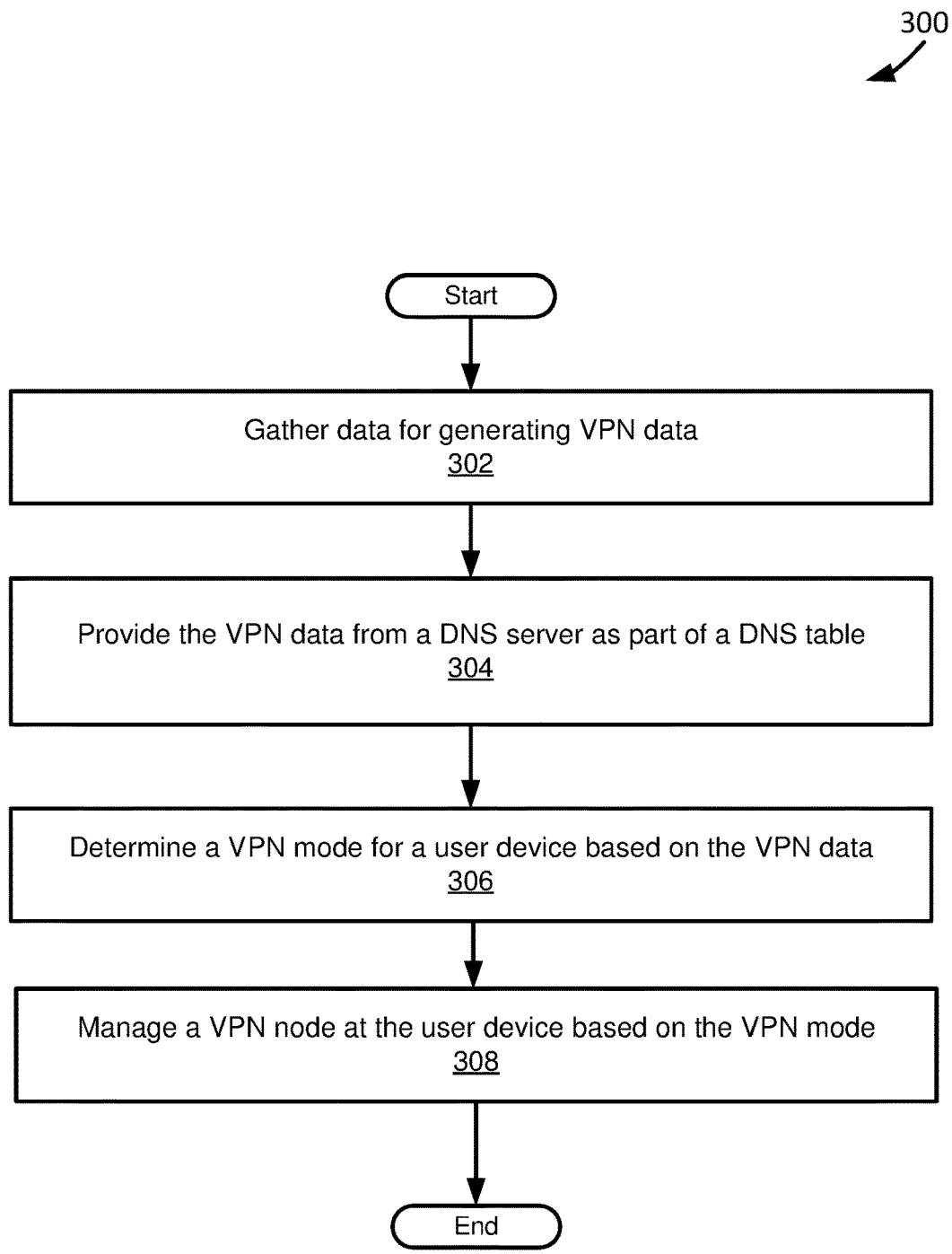
FIG. 3 depicts a diagram of a flowchart of an example of a method for managing a VPN node at a user device through a DNS server.

FIG. 3 depicts a diagram of a flowchart 300 of an example of a method for managing a VPN node at a user device through a DNS server. The flowchart 300 begins at module 302, where data for generating VPN data is gathered. A DNS server can gather data for generating VPN data. Data for generating VPN data can be gathered from devices within a private network. Devices within a private network can include networking devices used in transmitting data through the private network and other applicable devices, e.g. user devices, coupled to the private network. In a specific implementation, VPN data can be gathered based on a user devices performance when coupled at a local network location in a private network. VPN data generated at module 302 can include policies of a private network for establishing a VPN node, equipment to communicate with in establishing a VPN node, a passphrase or secret used in verifying a user for establishing a VPN node, network locations and/or identifications of equipment to communicate with in establishing a VPN node, sources that can send and receive data through a VPN node, and parameters related to data traffic communicated using a VPN node.

The flowchart 300 continues to module 304, where the VPN data is provided from a DNS server as part of a DNS table to a user device at a remote network location. A VPN data determination engine can access the VPN data provided by a DNS server. Depending upon implementation-specific or other considerations, the user device can access the VPN data by accessing a DNS view including the VPN data. Further depending upon implementation-specific or other considerations, the user device can provide a password or passphrase for accessing the VPN data.

The flowchart 300 continues to module 306, where a VPN mode is determined for establishing and maintaining a VPN node at the user device based on the VPN data. A VPN mode can be determined by a VPN mode determination engine. Depending upon implementation-specific or other considerations, a determined VPN mode can specify to establish and maintain a VPN node using dedicated network devices and/or encapsulated tunneling. For example a VPN mode can specify to establish a VPN node by communicating with a specific server.

The flowchart 300 continues to module 308, where the VPN node is managed based on the VPN node. A data routing engine can be used to transmit and receive data according to a VPN mode for managing a VPN node at the client device. Depending upon implementation-specific or other considerations, managing the VPN node includes establishing the VPN node. For example, managing the VPN node can include sending data used in establishing the VPN node. Further depending upon implementation-specific or other considerations, managing the VPN node includes maintaining the VPN node. For example, data can be transmitted and received according to a VPN mode.

Figure 4:
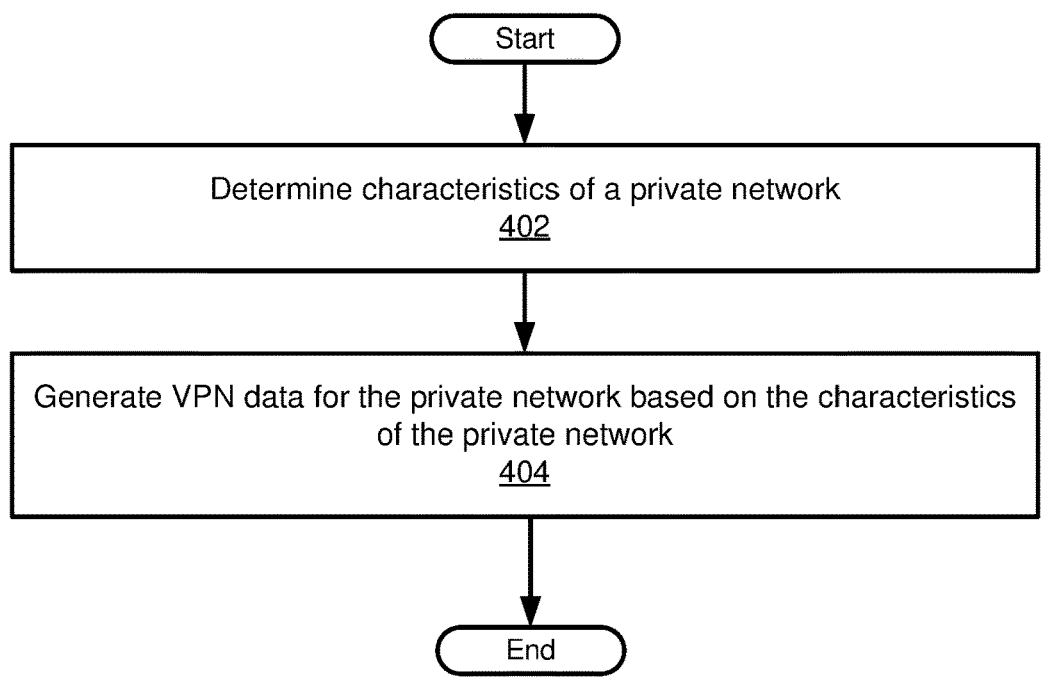
FIG. 4 depicts a diagram of a flowchart of an example of a method for generating VPN data.

FIG. 4 depicts a diagram of a flowchart 400 of an example of a method for generating VPN data. The flowchart 400 begins at module 402, where characteristics of a private network are determined. A DNS server can determine characteristics of a private network. Characteristics of a private network can be determined from networking behavior of devices within a private network. Devices within a private network can include networking devices used in transmitting data through the private network and other applicable devices, e.g. user devices, coupled to the private network. Depending upon implementation-specific or other considerations, characteristics of a network can be determined when a user device at which a VPN node is being established is at a local network location.

The flowchart 400 continues to module 404, where VPN data for the private network is generated based on the characteristics of the private network. VPN data can include policies of a private network for establishing a VPN node, equipment to communicate with in establishing a VPN node, a passphrase or secret used in verifying a user for establishing a VPN node, network locations and/or identifications of equipment to communicate with in establishing a VPN node, sources that can send and receive data through a VPN node, and parameters related to data traffic communicated using a VPN node.

Figure 5:
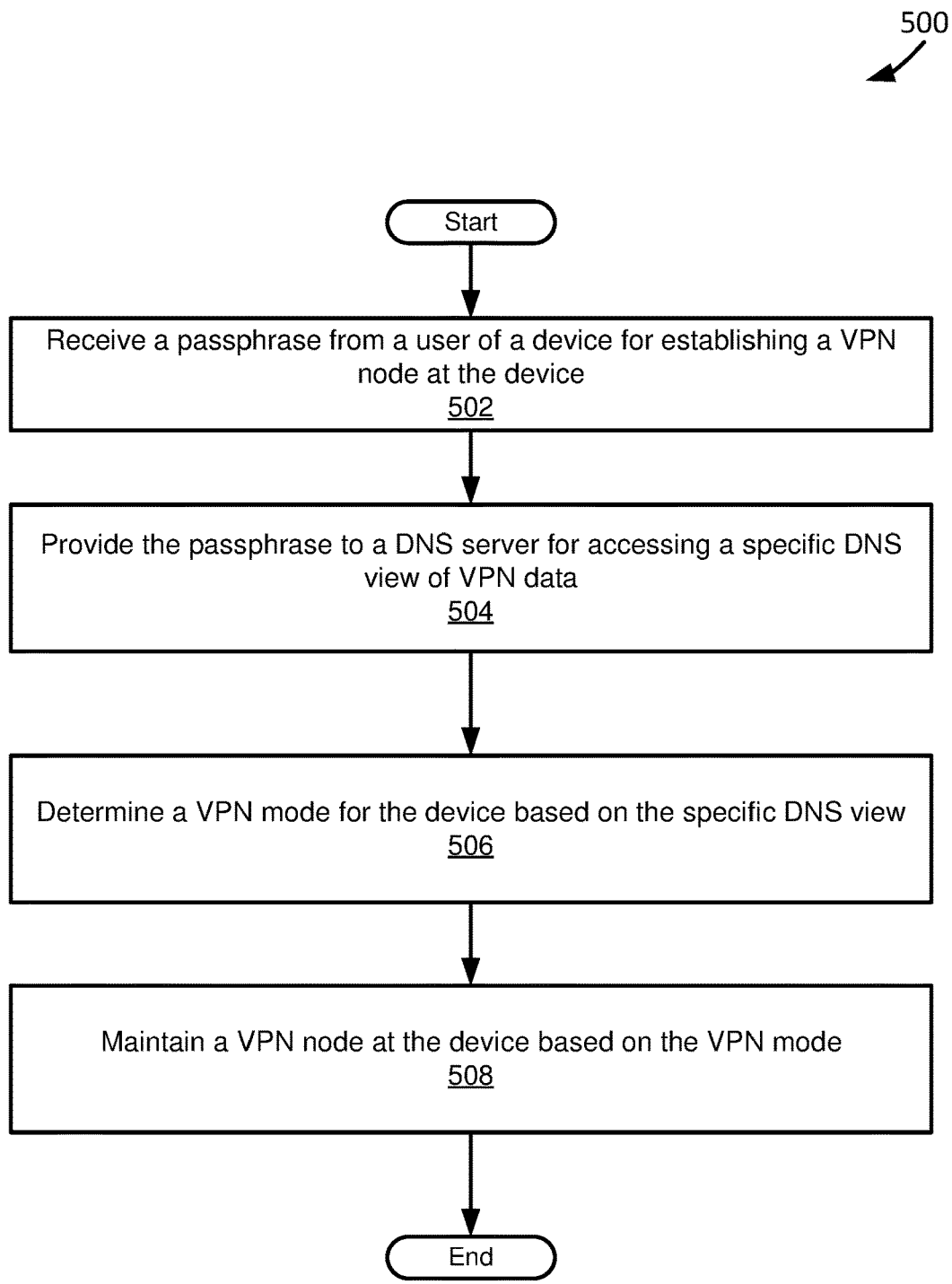
FIG. 5 depicts a diagram of a flowchart of an example of a method for maintaining a VPN node based on a passphrase provided by a user.

FIG. 5 depicts a diagram of a flowchart 500 of an example of a method for maintaining a VPN node based on a passphrase provided by a user. The flowchart 500 begins at module 502 where a passphrase is received from a user of a device for establishing a VPN node at the device. A VPN data determination engine can receive a passphrase. A passphrase can be uniquely assigned to a user of a device for establishing a VPN node at a device.

The flowchart 500 continues to module 504, where the passphrase is provided to a DNS server for accessing a specific DNS view of VPN data. A VPN data determination engine can provide the passphrase to a DNS server for accessing a DNS view used in determining VPN data. Depending upon implementation-specific or other considerations, a DNS view is specific to a user.

The flowchart 500 continues to module 506, where a VPN mode is determined based on the specific DNS view. A VPN mode can be determined by a VPN mode determination engine based on the specific DNS view. Depending upon implementation-specific or other considerations, a determined VPN mode can specify to establish and maintain a VPN node using dedicated network devices and/or tunneling. For example a VPN mode can specify to establish a VPN node by communicating with a specific server.

The flowchart 500 continues to module 508, where a VPN node is maintained based on the VPN mode. Data can be transmitted and received in maintaining the VPN node according to the VPN mode. A data routing engine can be used to transmit and receive data according to a VPN mode for managing a VPN node at the client device. Depending upon implementation-specific or other considerations, managing the VPN node includes establishing the VPN node. For example, managing the VPN node can include sending data used in establishing the VPN node. Further depending upon implementation-specific or other considerations, managing the VPN node includes maintaining the VPN node. For example, data can be transmitted and received according to a VPN mode.

These and other examples provided in this paper are intended to illustrate but not necessarily to limit the described implementation. As used herein, the term "implementation" means an implementation that serves to illustrate by way of example but not limitation. The techniques described in the preceding text and figures can be mixed and matched as circumstances demand to produce alternative implementations.

We claim:

1. A method comprising:
   gathering, by observing network behavior of networking devices within a private network, network operations data for generating virtual private network (VPN) data to be used in establishing a VPN node, the network operations data including a policy of the private network for establishing the VPN node, and one or more of an identification of the equipment to communicate with in establishing the VPN node, a location of the equipment to communicate with in establishing the VPN node, sources that can send and receive data through the VPN node, and parameters related to data traffic communicated using the VPN node;
   generating the VPN data based on the network operations data, the VPN data to be used by a domain name system (DNS) server to establish and maintain the VPN node for a client device coupled to a public network, the VPN data to be maintained at the DNS server as part of a DNS table;
   generating a cipher to be used in verifying a user of the client device and providing the cipher to the user of the client device;
   providing, to the client device in response to a request from the client device that includes the cipher, a portion of the VPN data as part of a DNS view of the DNS table;
   determining, using the portion of the VPN data, a VPN operations mode indicating a manner to establish and maintain the VPN node, the VPN operations mode based on one or more of a location of the client device and user characteristics of the user of the client device;
   establishing the VPN node according to the VPN operations mode using the portion of the VPN data;
   maintaining the VPN node according to the VPN operations mode using the portion of the VPN data.

2. The method of claim 1, wherein the characteristics of the user of the client device include one or more of an identification of the user, a title of the user, and access rights of the user.

3. The method of claim 1, wherein the VPN operations mode specifies to establish and maintain the VPN node through one or more of tunneling, encryption and encapsulation of data in VPN packets, and use of dedicated equipment within the public network.

4. The method of claim 1, wherein the network operations data is gathered automatically by crawling lists of data related to network operation of networking devices within the private network.

5. The method of claim 1, wherein the VPN data is associated with a domain name and the request from the client device comprises a DNS query.

6. The method of claim 1, wherein establishing the VPN node comprises executing a batch file at the client device.

7. The method of claim 1, further comprising transmitting and receiving data according to the VPN operations mode for managing the VPN node.

8. The method of claim 7, wherein managing the VPN node includes one or more of establishing the VPN node, sending data used in establishing the VPN node, and maintaining the VPN node.

9. The method of claim 7, wherein the transmitting and receiving data according to the VPN operations mode for managing the VPN node is performed within a network layer of an open systems interconnection (OSI) model.

10. The method of claim 1, further comprising obtaining one or more certificates to be used in establishing and maintaining the VPN node.

11. A system comprising:
a data determination engine configured to:
gather, by observing network behavior of networking devices within a private network, network operations data for generating virtual private network (VPN) data to be used in establishing a VPN node, the network operations data including a policy of the private network for establishing the VPN node, and one or more of an identification of the equipment to communicate with in establishing the VPN node, a location of the equipment to communicate with in establishing the VPN node, sources that can send and receive data through the VPN node, and parameters related to data traffic communicated using the VPN node;
generate the VPN data based on the network operations data, the VPN data to be used by a domain name system (DNS) server to establish and maintain the VPN node for a client device coupled to a public network, the VPN data to be maintained at the DNS server as part of a DNS table;
generate a cipher to be used in verifying a user of the client device and provide the cipher to the user of the client device;
the DNS server configured to provide, to the client device in response to a request from the client device that includes the cipher, a portion of the VPN data as part of a DNS view of the DNS table;
a VPN mode determination engine configured to determine, using the portion of the VPN data, a VPN operations mode indicating a manner to establish and maintain the VPN node, the VPN operations mode based on one or more of a location of the client device and user characteristics of the user of the client device;
a data routing engine configured to:
establish the VPN node according to the VPN operations mode using the portion of the VPN data;
maintain the VPN node according to the VPN operations mode using the portion of the VPN data.

12. The system of claim 11, wherein the characteristics of the user of the client device include one or more of an identification of the user, a title of the user, and access rights of the user.

13. The system of claim 11, wherein the VPN operations mode specifies to establish and maintain the VPN node through one or more of tunneling, encryption and encapsulation of data in VPN packets, and use of dedicated equipment within the public network.

14. The system of claim 11, wherein the network operations data is gathered automatically by crawling lists of data related to network operation of networking devices within the private network.

15. The system of claim 11, wherein the VPN data is associated with a domain name and the request from the client device comprises a DNS query.

16. The system of claim 11, wherein establishing the VPN node comprises executing a batch file at the client device.

17. The system of claim 11, the data routing engine being configured to transmit and receive data according to the VPN operations mode for managing the VPN node.

18. The system of claim 17, wherein the transmitting and receiving data according to the VPN operations mode for managing the VPN node is performed within a network layer of an open systems interconnection (OSI) model.

19. The system of claim 11, further comprising a certificate engine configured to obtain one or more certificates to be used in establishing and maintaining the VPN node.

20. A computer program product comprising instructions which, when the program is executed by a computer, cause the computer to perform a method comprising:
gathering, by observing network behavior of networking devices within a private network, network operations data for generating virtual private network (VPN) data to be used in establishing a VPN node, the network operations data including a policy of the private network for establishing the VPN node, and one or more of an identification of the equipment to communicate with in establishing the VPN node, a location of the equipment to communicate with in establishing the VPN node, sources that can send and receive data through the VPN node, and parameters related to data traffic communicated using the VPN node;
generating the VPN data based on the network operations data, the VPN data to be used by a domain name system (DNS) server to establish and maintain the VPN node for a client device coupled to a public network, the VPN data to be maintained at the DNS server as part of a DNS table;
generating a cipher to be used in verifying a user of the client device and providing the cipher to the user of the client device;
providing, to the client device in response to a request from the client device that includes the cipher, a portion of the VPN data as part of a DNS view of the DNS table;
determining, using the portion of the VPN data, a VPN operations mode indicating a manner to establish and maintain the VPN node, the VPN operations mode based on one or more of a location of the client device and user characteristics of the user of the client device;

establishing the VPN node according to the VPN operations mode using the portion of the VPN data;
maintaining the VPN node according to the VPN operations mode using the portion of the VPN data.

* * * * *